United States Patent Office 3,530,148
Patented Sept. 22, 1970

3,530,148
PROCESS FOR PRODUCING TETRAOXANE
Yasuhiko Miyake, Fujisawa, Tadafumi Yamauchi, Yokohama, and Katsumi Minomiya, Odawara, Japan, assignors to Mitsui Toatsu Chemicals Inc., Tokyo, Japan
Filed Oct. 30, 1967, Ser. No. 679,087
Int. Cl. C07d 19/00
U.S. Cl. 260—340                         11 Claims

ABSTRACT OF THE DISCLOSURE

A process for producing tetraoxane by adding an acid catalyst and an inert organic extracting agent to a formaldehyde source such as an aqueous solution of formaldehyde and paraformaldehyde, extracting the produced tetraoxane into said inert organic extracting agent and then separating the tetraoxane from the inert organic extracting agent containing the dissolved tetraoxane.

---

Figure 1:
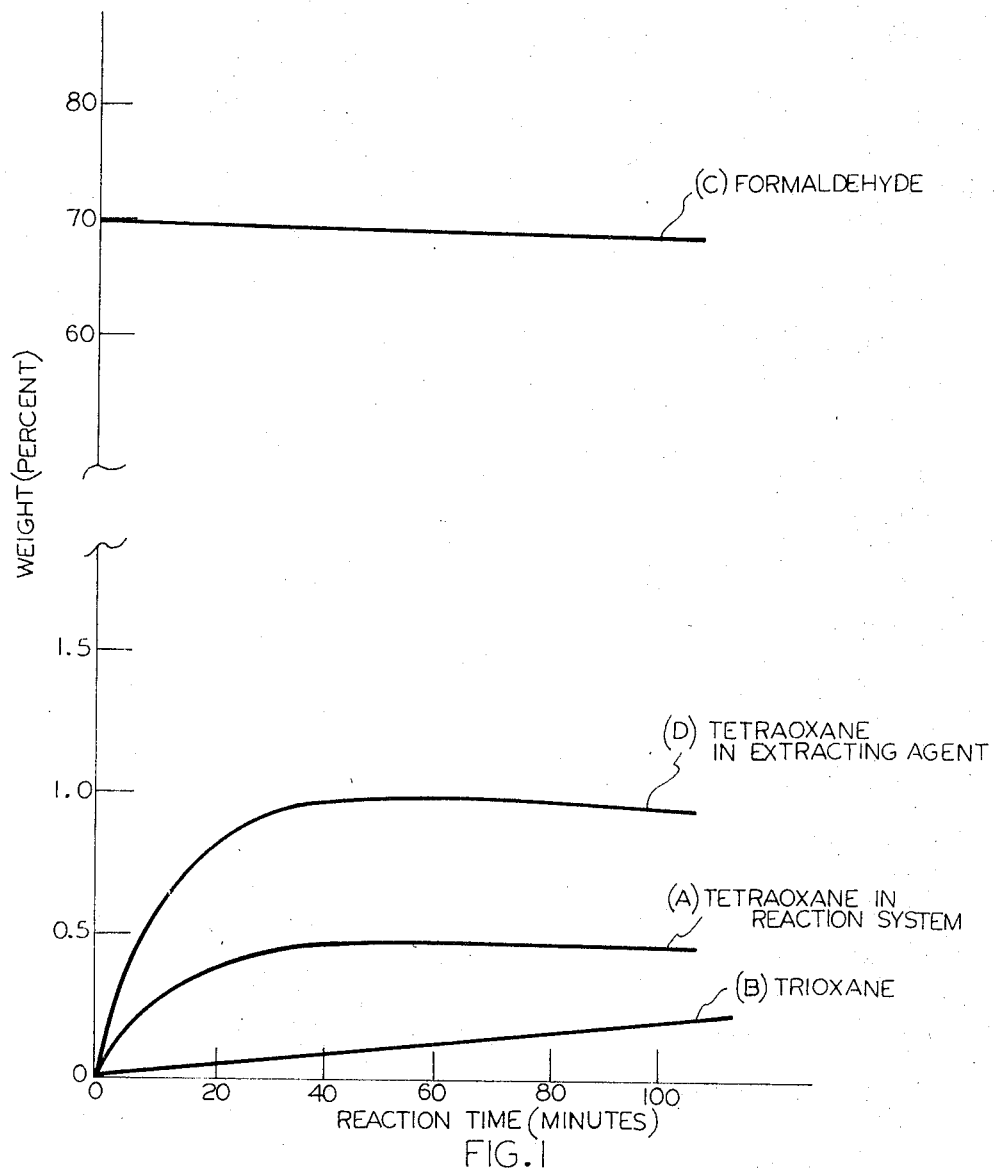

This invention relates to a new process for producing tetraoxane.

Tetraoxane is a kind of cyclic formal in which formaldehyde units, or methylene oxide units, are bonded in the form of a four-molecule ring as represented by the following chemical formula:

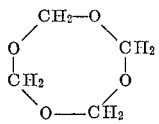

It is a tasteless and odorless needle crystal having a specific gravity of about 1.44, a melting point of 112° C. and a boiling point of 175° C.

Tetraoxane is very useful to the industry as an anhydrous formaldehyde source or, for example, as a raw material for various synthetic resins and chemicals made from high moleculr weight polyoxymethylenes and formaldehydes. Yet no advantageous method of producing tetraoxane has been suggested at all and it has been difficult to mass-produce tetraoxane.

Known methods of producing tetraoxane are as follows:

(1) There is a method wherein an acetylated high molecular weight polyoxymethylene is heated and decomposed under a vacuum. However, when the production of tetraoxane is attempted by this method, its reproducibility is so poor that no tetraoxane is easily obtained. Thus it can be hardly said to be an established producing method. Further, there is a defect that, even if tetraoxane is obtained accidentially by this method, its yield is so low as to be less than 5%. There is also the disadvantage to the industry that costly acetylated polyoxymethylene is required as the starting material.

(2) Tetraoxane is slightly produced by a method wherein a polyoxymethylene is thermo-decomposed in the presence of an acid. However, its yield is less than 1% and is only detectable with a gas-chromatograph. This method is not adaptable to the mass-production of tetraoxane.

Thus, it has been difficult to even obtain small amounts of tetraoxane for laboratory use by the known methods, much less producing it on an industrial scale.

As a result of making various investigations to eliminate the defects of the above mentioned methods and to mass-produce tetraoxane at low cost, we inventors have invented an entirely new method of producing tetraoxane very efficiently. This is quite different in the reaction type from the known methods of producing tetraozane.

In the method of the present invention, a formaldehyde source such as an aqueous solution or alcohol solution of formaldehyde or paraformaldehyde is reacted to produce tetraoxane under favorable temperature conditions, for example, 40 to 200° C., and favorable pressures in the presence of an acid catalyst such as acid potassium sulfate. The produced tetraoxane is extracted with an organic solvent in order to be constantly taken out of the reaction system and thus the producing reaction and extraction of tetraoxane are carried out simultaneously and continuously. Therefore, the concentration of tetraoxane in the reaction system will not remain in its equilibrium concentration for any appreciable time but will be kept more preferably below its equilibrium concentration. Under such conditions, tetraoxane can be produced at a rate higher than trioxane, dissolved in an organic extracting agent, taken out of the system and then separated and recovered by a suitable method from the extracting agent. The present invention involves a method of producing tetraoxane from such formaldehyde containing substances as an aqueous solution or alcohol solution of formaldehyde, paraformaldehyde or polyoxymethylene.

In the method of the present invention, there are present in the reaction system at least two phases; one consisting mostly of an extracting agent used to extract the produced tetraoxane and take it out of the system and the other being a raw material phase formed mostly of the formaldehyde source. In the reaction system, there also are present an acid catalyst to accelerate the reaction and, if desired, an inorganic salt to accelerate the transfer of the formed tetraoxane from the raw material system phase to the extracting agent as required.

When the formaldehyde source is an aqueous or alcohol solution of formaldehyde, the raw material phase will, of course, be a liquid phase. When the formaldehyde source is a solid under the reaction conditions such as paraformaldehyde or polyoxymethylene, the raw material phase will be a solid phase. The extracting agent for extracting tetraoxane is an organic solvent which is inert to formaldehyde, has a boiling point sufficiently high that it remains a liquid under the reaction conditions, is low in solubility with the raw material phase and can dissolve tetraoxane. Representative examples of suitable extracting agents are, for example, 1,2-dichlorethane or 1,1,2,2-tetrachlorethane.

The reaction system, in which are present the two phases of the raw material phase and the extracting agent phase, is severely stirred under a favorable temperature and pressure in the presence of an acid catalyst so as to react while the two phases are finely dispersed and at the same time while extracting the produced tetraoxane with the extracting agent and taking it out of the reaction system. When the extraction is carried out under such conditions that the tetraoxane concentration in the reaction system is kept lower than the equilibrium concentration or that at least the system may not be kept at the equilibrium concentration for an appreciable time, tetraoxane containing substantially no, or very little, by-produced trioxane will be produced.

As one of the methods of simultaneously carrying out the reaction and extraction, the reaction-extraction operation is stopped within a comparatively short time before the tetraoxane concentration in the reaction system reaches its equilibrium concentration. The two phases are left standing to be separated into two layers. Then the extracting agent is taken out and tetraoxane is recovered from it. In another method the raw material phase containing the dissolved catalyst is brought into countercurrent contact with the extracting agent. More specifically, fresh extracting agent is fed at a fixed rate into the reaction system and at the same time a part of the extracting agent having extracted and containing tetraoxane in the reaction system is separated from the raw material system phase and is taken at a fixed rate out of the reaction system. The raw material phase including the catalyst and the extracting agent are thereby brought countercurrently into contact with each other so that the contact time may be adjusted to be kept within a given time by adjusting the rate of feeding the extracting agent into and taking it out of the reaction system.

The reason for extracting tetraoxane as it is produced so that the tetraoxane concentration in the reaction system may not remain in the equilibrium concentration for any appreciably long time and preferably is kept at a value lower than the equilibrium concentration is explained as follows. It has not been known heretofore that when an aqueous solution or alcohol solution of formaldehyde, paraformaldehyde or polyoxymethylene is heated to a temperature such as, for example, 40 to 200° C., tetraoxane will be obtained as the main reaction product in the initial periods of the reaction. In the past such reaction has been carried out for a long period of time and only trioxane has been produced as the main reaction product at a very advantageous yield. Therefore, in the reaction process wherein such formaldehyde source is used, trioxane has been only produced and the production of tetraoxane has not been attempted.

As a result of making detailed investigations of the reaction of formaldehyde under the action of an acid catalyst, we have discovered the following new factors which have not been known heretofore in reactions of this kind. For simplicity, the following explanation is given in terms of an aqueous solution of formaldehyde as the formaldehyde source.

When formaldehyde is reacted under a favorable temperature, for example, at 40 to 200° C. and favorable pressure, the variations with time of the concentrations of the three ingredients, namely, the raw material formaldehyde and the reaction products trioxane and tetraoxane, as shown in FIG. 1. The concentrations of the three ingredients were determined by gas-chromatography.

In FIG. 1, the reaction system used comprised 5% by weight potassium bisulfate as a catalyst in an aqueous solution of 70% by weight formaldehyde and the resulting solution was kept at 96° C. in a sealed tube. In the graph, the reaction time is taken on the abscissa and the concentration is taken on the ordinate. Curve ($a$) represents the concentration of tetraoxane in the reaction system. Curves ($b$) and ($c$) represent the concentrations of trioxane and formaldehyde, respectively, against the reaction time. Curve ($d$) represents the concentration of tetraoxane in the extracting agent when 1,1,2,2-tetrachlorethane, in an amount equal to that of the aqueous solution of formaldehyde, was made to coexist as an extracting agent in the reaction system.

As shown in FIG. 1, in the initial period of the reaction, the production rate and concentration of trioxane was much lower than that of tetraoxane, whereas the production rate of tetraoxane was very fast. The tetraoxane concentration reached about 0.5% by weight within 40 minutes and was not seen to appreciably increase thereafter. It thus may be considered to have reached a kind of equilibrium value. On the other hand, only 0.08% trioxane was produced within the same period.

This shows that in an aqueous solution of formaldehyde containing an acid catalyst the production rate of tetraoxane is remarkably higher than that of trioxane. By comparing the gradient of the tangent of the production curve of tetraoxane at zero reaction time, when the decomposing reaction of tetraoxane was negligible, with that of trioxane, it was found that the production rate of tetraoxane is about 15 times faster than that of trioxane.

Thus, the production rate of textraoxane is much higher than that of trioxane and reaches a constant equilibrium concentration value within a relatively short time. This value is comparatively low. However, this is understood to be due to the characteristic that tetraoxane is so highly active as to be easily decomposed by the action of the acid catalyst.

Only in the later period of the reaction, the concentration of trioxane was seen to remarkably increase, exceed the concentration of tetraoxane and reach an equilibrium value of at least 4 to 5% by weight. In the conventional production of trioxane, the reaction has been carried out to the vicinity of the equilibrium concentration of trioxane and therefore trioxane has become the main reaction product and no concern has been shown for tetraoxane.

The equilibrium concentration of tetraoxane is a function of the concentration of the formaldehyde in the raw material system and tends to remarkably increase with the increase of the formaldehyde concentration in the raw material system. It also is related to the temperature of the reaction system and the kind of the solvent in the raw material system but is not related to the kind of catalyst.

Furthermore, the velocity of tetraoxane formation in reaching the equilibrium concentration and the production rate of trioxane remarkably vary depending on the kind and amount of the acid catalyst to be used, the reaction temperature and the formaldehyde concentration in the raw material system. For example, as shown in the following table, if a strong acid such as sulfuric acid or sulfonic acid is used instead of potassium bisulfate, the production rate of tetraoxane increases, and will instantly reach the equilibrium concentration and the production rate of trioxane also increases considerably. On the other hand, with a weakly acid catalyst, such as cadmium chloride or lead sulfate, several tens of minutes to several hours are required to reach the equilibrium concentration of tetraoxane, while the production of trioxane becomes so slow as to be hardly observed in this range.

| Conc. of CH₂O (wt. percent) | Reaction temperature, ° C. | Catalyst Type | Conc. | Equilibrium conc. of tetraoxane (wt. percent) | Time until the equilibrium concentration of tetraoxane is reached, $t_e$ (min.) | Trioxane concentration at the time $t_e$ (wt. percent) |
|---|---|---|---|---|---|---|
| 80 | 96 | KHSO₄ | 5 | 0.8 | 20 | 0.15 |
| 70 | 96 | KHSO₄ | 5 | 0.5 | 40 | 0.20 |
|  | 100 | H₃PO₄ | 5 | 0.5 | 15 | 0.40 |
|  | 100 | H₂SO₄ | 5 | 0.5 | 2 | 0.50 |
|  | 100 | p-CH₃C₆H₅SO₃H | 5 | 0.35 | 3 | 0.30 |
|  | 100 | IR-200 [1] | 5 | 0.35 | 3 | 0.35 |
| 60 | 96 | KHSO₄ | 5 | 0.35 | 100 | 0.32 |
|  | 100 | CdCl₂ | 5 | 0.35 | 150 | 0.07 |
|  | 100 | PbSO₄ | 5 | 0.35 | 180 | 0 |

[1] Ion exchange resin.

The time relation of the production of tetraoxane and trioxane is illustrated by the fact that, before tetraoxane reaches the equilibrium concentration, the production of trioxane will be comparatively slow, the amount of its production will be negligible as compared with that of tetraoxane and, though there may be some difference depending on the condition, the production of trioxane will become remarkable only at or a little beyond the point that tetraoxane reached the equilibrium concentration. This is useful in determining the extracting conditions for controlling the quality of tetraoxane taken out of the system and in limiting the amount of by-produced trioxane mixed with tetraoxane which is continuously taken out of the system by extraction with an organic extracting agent in the method of the present invention. That is to say, in extracting tetraoxane from the reaction system, by adjusting the extracting velocity so that the tetraoxane concentration in the reaction system may not remain at its equilibrium concentration for a long time but may be preferably kept below the equilibrium concentration, the amount of trioxane extracted with tetraoxane can be decreased or made substantially nil.

As explained in the above, in the reaction of an aqueous solution of formaldehyde in the presence of an acid catalyst, it is surprising that the production rate of tetraoxane is so much faster than that of trioxane. The low equilibrium concentration of tetraoxane in the reaction system is not because tetraoxane is more difficult to produce than trioxane but merely because it is so much higher in the chemical activity than trioxane, that, when the produced tetraoxane remains in the acid reaction system, it quickly decomposes.

The tetraoxane concentration in the extracting agent as observed, when 1,1,2,2-tetrachlorethane as an extracting agent in an amount equal to that of the formaldehyde solution is made to coexist under the same reaction conditions, is represented by the curve (d) in FIG. 1. This curve shows that the extraction rate of tetraoxane is not slower than the production rate of tetraoxane and that, with the lapse of reaction time, the produced tetraoxane increases in concentration while being distributed in response to the distribution ratio in the raw material system phase and the extracting agent phase until it maintains an equilibrium concentration at concentrations corresponding to the distribution ratio. For this reason, the phrase "the equilibrium concentration of tetraoxane in the reaction system" often used herein means the equilibrium concentration of tetraoxane in the raw material system phase of the two phases coexisting in the reaction system and the equilibrium concentration of tetraoxane in the extracting agent phase having a distribution equilibrium in a fixed relation.

It has never been pointed out before and was first discovered in the researches leading to the present invention that the production rate of tetraoxane is much higher than that of trioxane as explained above. Further, the rate and equilibrium relations in the production of tetraoxane and trioxane in the presence of an acid catalyst from an aqueous solution of formaldehyde as explained above have been confirmed to be established not only in the aqueous solution of formaldehyde but also in paraformaldehyde and polyoxymethylene which will be solid under the reaction conditions, and in alcohol solutions of formaldehyde and the like. An object of the present invention is to provide a new process for producing tetraoxane on the basis of such newly discovered facts regarding the reaction of formaldehyde.

Though the production reaction of tetraoxane is faster than that of trioxane, in the known conventional process, under the above mentioned reaction conditions, substantially no tetraoxane has been obtained but for all intents and purposes, only trioxane has been produced. This is because of the following reasons.

When an aqueous solution of formaldehyde is made to react for a long time, the reaction normally is stopped after the reaction products reach an equilibrium concentration. The reaction products are separated as in the known conventional production of trioxane and each yield is determined by the equilibrium concentration. Therefore, the trioxane having a very high equilibrium concentration will be likely to be obtained as the main product and the process will be disadvantageous to the production of tetraoxane which has an equilibrium concentration so much lower than that of trioxane as to be negligible. It is difficult to obtain tetraoxane by this process.

Trioxane has a low azeotropic point with water in the aqueous solution of formaldehyde. Therefore, there has been suggested a method wherein the reaction is carried out while constantly distilling produced trioxane out of the system by carrying out the distillation during the reaction. Because the equilibrium in the reaction system is constantly disrupted to favor the production of trioxane, this method is effective only to increase the production of trioxane but is not effective to the production of tetraoxane. According to our measurements, the boiling point of tetraoxane is about 175° C. at atmospheric pressure and is thus much higher than boiling points of the raw material systems and trioxane. Furthermore tetraoxane does not have such a low aseotropic point with water as trioxane. Therefore, it is difficult to distil tetraoxane out of the system by distillation during the reaction; only trioxane having a lower boiling point distills out. Trioxane always remains in the reaction system. Therefore, the tetraoxane already produced at a rate higher than of trioxane will again quickly decompose and, as a result, tetraoxane only at the low equilibrium concentration is produced.

In the present invention, it has become possible to industrially produce tetraoxane by constantly taking produced tetraoxane out of the reaction system with an extracting agent so that the reaction of the equilibrium system always proceeds advantageously to the production of tetraoxane. We have discovered that, when tetraoxane is extracted and separated out of the system under such conditions that the concentration of the produced tetraoxane in the reaction system is not allowed to remain at its equilibrium concentration for a long time or is preferably maintained lower than that by simultaneously carrying out the reaction and extraction while keeping the raw material system in contact with the extracting agent under favorable reaction conditions as explained above, tetraoxane will be able to be smoothly produced as a main reaction product.

In the present invention, by closely adjusting the extracting process, it is possible to obtain tetraoxane while controlling the amount of production of trioxane to be so small as to be substantially negligible. Even if the extracting process is not closely controlled, trioxane is by-produced in relatively higher amounts, is dissolved in the extracting agent together with tetraoxane and comes out of the reaction system, there will be no technical problem, because trioxane can be easily separated as a low boiling distillate from tetraoxane in subsequent separating and recovering steps, and returned to the original reaction system wherein it is again decomposed into formaldehyde in the presence of an acid catalyst and is used for the production of tetraoxane. Therefore no loss of formaldehyde source occurs.

Furthermore, since the tetraoxane concentration in the extracting agent and that in the raw material phase show a relationship of a kind of distribution equilibrium as shown by the curve (d) in FIG. 1, in the process of the present invention, if an extracting agent having a high solubility for tetraoxane and having a high distribution ratio for the raw material system phase is used, the yield of tetraoxane per unit extracting operation increases.

For this reason, as required, if an inorganic salt such as sodium chloride or potassium chloride is added so that the distribution of tetraoxane in the extracting agent is higher than in the raw material system phase by a salting effect, the tetraoxane concentration in the extracting agent can be increased very effectively.

In the present invention, as a starting material used as the formaldehyde source there is selected at least one kind from the group comprising solutions of formaldehyde dissolved in an inorganic or organic solvent such as an aqueous solution or alcohol solution of formaldehyde and/or paraformaldehyde, alpha-polyoxymethylene, beta-polyoxymethylene and gamma-polyoxymethylene which contain formaldehyde ingredients and can easily discharge formaldehyde under the reaction conditions. Specifically preferable are an aqueous solution or alcohol solution of formaldehyde and paraformaldehyde. A formaldehyde concentration of about 20 to about 100% by weight and more preferably about 50 to about 100% by weight can be used. Such solid formaldehyde sources, for example, paraformaldehyde or polyoxymethylene can be used either as suspended in such solvent as, for example, water or alcohol or as a solid raw material system phase as it is.

As the acid catalyst used in the present invention, there are preferred catalysts having a high solubility in the raw material liquid phase but low solubility in the extracting agent. Also, catalysts which can be easily separated from the extracting agent by filtration or the like, such as, for example, an ion exchange resin having a sulfone radical are especially adapted to the process of the present invention.

Suitable catalysts conforming to these conditions are:

(1) Inorganic acids or their acid salts in which the degree of dissociation of hydrogen ions expressed as a dissociation constant measured in aqueous solution at 25° C. is more than $1 \times 10^{-4}$ such as, perchloric acid, sulfuric acid, potassium bisulfate and sodium bisulfate.

(2) Compounds which will easily give the same acidity characteristics as mentioned in (1) in water such as ferric sulfate, aluminum sulfate, potassium persulfate, potassium pyrosulfate and polyphosphoric acid.

(3) Organic carboxylic acids having the same acidity characteristics as in (1) as oxalic acid and trichloracetic acid and picric acid.

(4) Sulfonic acids having 6 to 20 carbon atoms and organic sulfonic acids having 6 to 20 carbon atoms and having at least one of the hydrogen atoms substituted with an amino radical, hydroxyl radical or such hydrophilic atom or atom group as a ketone-form oxygen atom such as benzene sulfonic acid, p-toluene sulfonic acid, naphthalene sulfonic acid, p-amino benzene sulfonic acid, 1-naphthylamine-6 or 7-sulfonic acid (Cleve's acid), $\beta$-naphthol sulfonic acid and anthraquinone-$\beta$-sulfonic acid and acid ion exchange resins in which a cross-linked polystyrene or a phenol resin is the base into which sulfone radicals have been introduced.

(5) Halides of elements selected from elements belonging to groups IIb, IIIa, IV, VI and VIII in Mendelyeev's Periodic Table such as ferric chloride, aluminum chloride, tin tetrachloride and boron trifluoride-water complex.

It is preferable to use such strong acid catalysts as sulfuric acid, perchloric acid or ferric sulfate in an amount of 0.001 to 20% on the weight of a Formalin source and such medium acid catalysts as potassium bisulfate, phosphoric acid or oxalic acid in an amount of 0.1 to 50% by weight.

In the present invention, if desired, the tetraoxane concentration in the extracting agent can be increased by dispersing or dissolving an inorganic salt in the reaction system or preferably in the raw material systems. This is effective specifically when the original system phase is an aqueous solution of formaldehyde. Preferably salts are chlorides of alkali metals and alkaline earth metals such as sodium sulfate and potassium sulfate. The limit of use of the inorganic salt is its saturated solubility in the raw material system phase under the reaction condition. But, in some cases a part of the inorganic salt can be deposited as a solid beyond its solubility.

It is necessary that the organic extracting agent used in the present invention first should be inert to formaldehyde, should have a boiling point such that it can remain liquid at least in the reaction system, should be of low solubility with the raw material phase and should further have an ability to dissolve tetraoxane and to extract tetraoxane from the raw material system.

Among extracting agents satisfying these conditions are, for example, aliphatic hydrocarbons having 5 to 10 carbon atoms such as n-hexane, cyclohexane and n-heptane chlorinated or fluorinated aliphatic hydrocarbons having 1 to 10 carbon atoms such as chloroform, carbon tetrachloride, 1,2-dichlorethane, 1,1,2-trichlorethane, 1,1,2,2-tetrachlorethane and 1,1,2,2-tetrafluorethane, aromatic hydrocarbons having 6 to 12 carbon atoms such as benzene, toluene and xylene, chlorinated, fluorinated and nitrated aromatic hydrocarbons having 6 to 12 carbon atoms in which at least one hydrogen atom is substituted with chlorine, fluorine or a nitro radical such as monochlorobenzene, nitrobenzene and alpha-chloronaphthalene, aromatic hydrocarbon ethers having 7 to 12 carbon atoms and aliphatic hydrocarbon alkyl ethers consisting of 4 to 12 carbon atoms such as diisopropyl ether and di-n-butyl ether and other aliphatic esters consisting of 4 to 8 carbon atoms and aromatic esters having 8 to 12 carbon atoms. They can be used alone or as mixtures of two or more together.

The ratio of the amounts of the extracting agent and the raw material phase in the reaction system can vary from 0.1 to 100 parts by volume of the extracting agent to 1 part by volume of the raw material phase. When the raw material phase is a solid such as, for example, solid paraformaldehyde, it will be convenient when using a mechanical operation such as stirring to make the content of the extracting agent about 4 to 100 times as large as of the raw material phase. When the liquid raw material phase is an aqueous solution of formaldehyde, this ratio can be reduced to about 0.1 to about 5.

Any suitable apparatus for working the present invention can be used. For example, when a batch process is used wherein the reaction is stopped in a comparatively initial stage and the extracting agent phase is taken out of the reaction system, the process can be carried out with a reactor having an ordinary warmer, stirrer and reflux condenser or pressure device. A continuous operation can be carried out, for example, in a tower-type countercurrent contact device or a reactor to which the raw material phase and the extracting agent are added at a constant velocity, then the mixture is led to a two-layer separator attached to it and is separated into the raw material phase and extracting agent, the extracting agent is taken out and the raw material phase is supplemented to replace the consumed formaldehyde and is returned to the reactor.

An apparatus can be also used wherein the two-phase mixture of the raw material phase and the extracting agent is made to flow into contact with a solid acid catalyst layer kept under favorable reaction conditions, such as, for example, an acid ion exchange resin, and then the extracting agent is separated from the raw material phase.

In taking the extracting agent out of the reaction system, in order to separate the reaction system into two layers of the raw material phase and the extracting agent, there can be applied any of such separating methods as a settling method by leaving them standing by utilizing the difference between their specific gravities, a centrifugal separating method and, as required, a compressing method and filtering method.

In the extracting agent taken out of the reaction system are present as dissolved, in practice, a small amount of by-product trioxane and the raw material phase substance are contained in the extracting agent together with the main product tetraoxane. They are easily separated from the tetraoxane while separating the tetraoxane from the extracting agent, for example, as low boiling point substances at the time of distillation or as substances present as dissolved at the time of the recrystallization in the separating process of distillation, concentration and then recrystallization. It is preferable that the separated raw material phase and by-produced trioxane be returned to the reaction system.

The operation of carrying out the extraction simultaneously with the reaction of producing tetraoxane can be carried out in a temperature range of 40 to 200° C.

A preferable temperature range is 60 to 150° C. It is also possible to carry out the operation under a suitable elevated pressure depending on the boiling points of the extracting agent and raw material phase used in this temperature range or the value of the vapor pressure.

One of the remarkable advantages of the method of the present invention is the selection of the raw material to be used. In the past it has been impossible to produce tetraoxane directly from ordinary Formalin or paraformaldehyde. Heretofore, the raw material required has been a costly material prepared by stabilizing the terminal hydroxyl radical of the molecular chain of solid polyoxymethylene of a comparatively high molecular weight by such means as, for example, esterification, urethanification or etherification or by introducing such stable component units as, for example, a C—C bond unit into a polyoxymethylene molecular chain by copolymerization or the like. On the other hand, in the method of the present invention, such costly raw material is not used but Formalin, paraformaldehyde, an alcohol solution of formaldehyde, alpha-polyoxymethylene, beta-polyoxymethylene and gamma-polyoxymethylene which are easily and cheaply available in quantities can be freely selected and utilized. Furthermore, no special catalyst is required. Any ordinary well known acid catalyst can be utilized. In the known method which uses a principle of pyrolyzing a high molecular weight substance, the reproducibility is poor and various difficulties are evident in regard to the apparatus needed for working it on a large industrial scale, whereas, in the present method, the reaction is smooth, the operation and control are easy, the reaction conditions are also milder than in the known method and therefore such side reaction products as formic acid, methanol and methyl formate are reduced.

By properly selecting the extracting agent, it is possible to extract and separate the produced tetraoxane in a state in which the tetraoxane concentration in the extracting agent phase is much higher than the equilibrium concentration of the tetraoxane in the raw material phase. This includes also a kind of concentrating operation and is economically advantageous in the production of tetraoxane.

In the known method, the produced tetraoxane is contaminated with formaldehyde and other side decomposition products and must therefore be refined by such operation as, for example, recrystallization or sublimation after production. On the other hand, in the present method, since the extracting agent can be also a solvent for recrystallizing tetraoxane, when the extracting agent containing tetraoxane is concentrated and then tetraoxane is separated and obtained from the extracting agent by recrystallization or any other proper method, for example, distillation, tetraoxane of a high purity will be obtained as it is.

As with trioxane, the tetraoxane obtained in the present invention is industrially useful as an anhydrous formaldehyde source and is utilized, for example, for the production of polyoxymethylene. The first advantage over trioxane so far known is that tetraoxane is stable at room temperature but still is very high in chemical reactivity. For example, even in the case of producing polyoxymethylene, tetraoxane shows a polymerizability much higher than of trioxane and is higher than trioxane in the copolymerizability with other monomers. When tetraoxane is used, it will become possible to carry out new reactions which have been impossible with trioxane.

The second advantage is that tetraoxane is a little sublimable but is not so sublimable as trioxane. Further, the crystals of tetraoxane are not so soft and sticky as are crystals of trioxane but are hard. Therefore, tetraoxane is more advantageous than trioxane in preservation, transportation and measurement. Thus, tetraoxane produced by this invention is an anhydrous formaldehyde source very excellent in chemical and physical properties for industry.

The following examples are presented.

EXAMPLE 1

2 liters of an extracting agent and an aqueous formaldehyde source of the type and amount listed in Table 1 were added into a reaction flask of a capacity of 3 liters having a stirrer, reflux condenser and thermometer. The flask was put into an oil bath and the contents were warmed to a fixed temperature while being stirred. Then an acid catalyst was added. When the catalyst was added, the reaction started. In the reaction system, the raw material phase and the extracting agent phase were dispersed into each other by stirring to provide a suspended state. The contents were kept at a fixed temperature while being severely stirred for a fixed time, the stirring was then stopped, the reaction flask was taken out of the oil bath and was left standing in cold water to be cooled. The contents in the reaction flask soon separated into two layers. After they were left overnight, the extracting agent layer was taken out and the amount of by-produced trioxane contained in the extracting agent was determined with a gas-chromatograph and is listed in Table 1. Then a small amount of sodium carbonate was added to it and the resulting mixture was shaken well. Then it was first distilled under atmospheric pressure to distill out about 1/20 of the amount of the extracting agent phase and was then concentrated under reduced pressure in a distillation tower of 80 cm. in length packed with stainless steel rings to thereby crystallize and deposit tetraoxane. The tetraoxane was recovered in the amounts set forth in Table 1. The feature of this reaction process was to stop the reaction within a comparatively short time by using a comparatively large amount of the extracting agent.

TABLE 1

| No. | Raw material phase | Extracting agent | Acid catalyst Type | Grams | Temp., (° C.) | Time (min.) | Tetraoxane (g.) | Trioxane (g.) |
|---|---|---|---|---|---|---|---|---|
| 1.1 | 55% Formalin, 600 cc | 1,1,2-trichlorethane | Potassium bisulfate | 20 | 92 | 45 | 11 | 8.0 |
| 1.2 | 70% Formalin, 600 cc | Benzene | Phosphoric acid | 20 | 70 | 40 | 8 | 6.5 |
| 1.3 | do | 1,1,2-tetrachlorethane | Potassium bisulfate | 20 | 96 | 40 | 20 | 4.5 |
| 1.4 | do | do | Cleve's acid | 6 | 96 | 20 | 26 | 6.5 |
| 1.5 | do | do | Ferric sulfate | 8 | 96 | 15 | 23 | 8.0 |
| 1.6 | 88% paraformaldehyde, 500 g | Monochlorobenzene | Oxalic acid | 8 | 90 | 15 | 18 | 12 |
| 1.7 | do | 1,1,2-trichlorethane | Cadmium chloride | 100 | 98 | 120 | 36 | 14 |
| 1.8 | Cyclohexanol solution of 50% by weight formaldehyde, 600 cc. | Toluene | Boron fluoride etherate | 12 | 80 | 10 | 8.0 | 9.0 |
| 1.9 | Solution prepared by mixing and dissolving 120 g. of sodium chloride in 600 cc. of 50% Formalin. | 1,1,2-tetrachlorethane | Cleve's acid | 15 | 92 | 30 | 18 | 15 |

The by-produced trioxane in the above table was capable of being perfectly separated from tetraoxane while the tetraoxane in the extracting agent was being concentrated under a reduced pressure and was available for return to the reaction system to be used again.

EXAMPLE 2

A horizontal tube of a diameter of about 2 cm. was attached to the side of a reaction flask of a capacity of 1 liter having a stirrer, reflux condenser and thermometer and was connected to the upper part of a vertical two-layer separating tube of an inside diameter of about 3 cm. and a height of about 40 cm. having a flow adjusting cock in the lower part. The separating tube was closed in the upper part except for the connection with the horizontal tube coming out of the reaction flask. 400 cc. of a formaldehyde source and 400 cc. of an extracting agent were put into the reaction flask. The level of this two-phase mixture reached the mouth of the horizontal tube attached to the side of the reaction flask. The reaction flask was fitted with a mantle heater and was kept at a fixed reaction temperaure. A catalyst was added to the flask and extracting agent was fed into the flask at a fixed velocity from the top of the reflux condenser. Thus, the amount of the liquid in the flask increased, a part of it overflowed ino the vertical two-layer separating tube and was left standing there to separate into two layers, the raw material phase and the extracting agent phase. The extracting agent having a specific gravity higher than of the raw material phase and accumulating in the lower part of the two-layer separating tube was taken out of the reaction system through the cock attached to the lower part of the separating tube. The boundary surface of the separation of the two layers in the two-layer separating tube was kept at a fixed height by adjusting the rate of taking out and feeding in of the extracting agent. Thus, the reaction and extraction were continued for 2 hours while keeping the raw material phase and the extracting agent in countercurrent contact. The extracting agent taken out and containing produced tetraoxane was left standing overnight. The formaldehyde dissolved in the extracting agent was separated as a precipitate of paraformaldehyde. The extracting agent was then shaken well with a small amount of sodium carbonate to neutralize the trace of an acid catalyst likely to have been mixed therein and then, as in Example 1, tetraoxane containing no trioxane at all was separated from the extracting agent. The amount of trioxane contained in the extracting agent was measured with a gas-chromatograph. Examples carried out under various conditions according to this procedure are shown in Table 2.

packed tower 7 of an inside diameter of 5 cm. and a height of 160 cm. having an inlet 100 cm. from the bottom. The tower was kept at about 120° C. in the upper part and at about 150° C. below 10 cm. above the inlet. When the extracting agent system was passed through this tower, the small amount of by-produced trioxane dissolved together with tetraoxane in the extracting agent and taken out of the reaction system was distilled out in the upper part of the tower as a low boiling point substance together with a part of the formaldehyde and water dissolved therein, and the extracting agent tetrachlorethane, which were passed through a condenser 8, and then returned to the reactor where they were used again for the production of tetraoxane.

Thus, the extracting agent containing tetraoxane, perfectly separated from the by-produced trioxane, formaldehyde and water, accumulated in the bottom of kettle 9 which was kept at 146° C and was continuously taken out with a siphon 10. When this process was carried out for 2 hours, the extracting agent containing an average of 0.61% by weight tetraoxane was obtained at the rate of 4 litres/hour. When it was concentrated under a reduced pressure to deposit tetraoxane 69 g. of tetraoxane containing no trioxane were obtained.

(B) In the same manner as described above, a liquid prepared by mixing an aqueous solution of 70% formaldehyde and 1,1,2,2 - tetrachlorethane at a ratio of 3:4 by volume was fed at the rate of 7 liters/hour from the tank 4 into a reactor containing 150 g. of an acid ion exchange resin so as to react. The overflow was then separated in the two-layer separating tube 2. The extracting agent was taken out of the bottom part of said tube at a rate of 4.2 liters/hour. The raw material system phase was taken out of the head part of the tube at a rate of 2.8 liters/hour. A stainless steel screen in the inlet of the tube 2, prevented the ion exchange resin catalyst from overflowing out of the reactor. The raw material phase thus taken out was adjusted to be again of a formaldehyde content of 70% by weight by concentration under a reduced pressure and was reused. Under otherwise the same conditions as were explained in (A) above, the

TABLE 2

| No. | Formaldehyde source | Extracting agent | Catalyst Type | Grams | Temp. (° C.) | Rate a | Tetraoxane (g.) | Trioxane (g.) |
|---|---|---|---|---|---|---|---|---|
| 2.1 | 55% Formalin | 1,1,2-trichlorethane | Potassium pyrosulfate | 15 | 90 | 1.0 | 8.2 | 2.3 |
| 2.2 | 70% Formalin | 1,1,2,2-tetrachlorethane | Potzssium bisulfate | 15 | 96 | 0.7 | 14.4 | 4.8 |
| 2.3 | do | do | do | 60 | 96 | 1.5 | 30.0 | 5.6 |
| 2.4 | do | do | Ferric sulfate | 15 | 96 | 1.5 | 32.0 | 14.2 |
| 2.5 | 90% paraformaldehyde | do | Cleve's acid | 15 | 98 | 2.0 | 38.4 | 3.3 | a Rate of feeding in and removing extracting agent in liters/hour.

EXAMPLE 3

Figure 2:
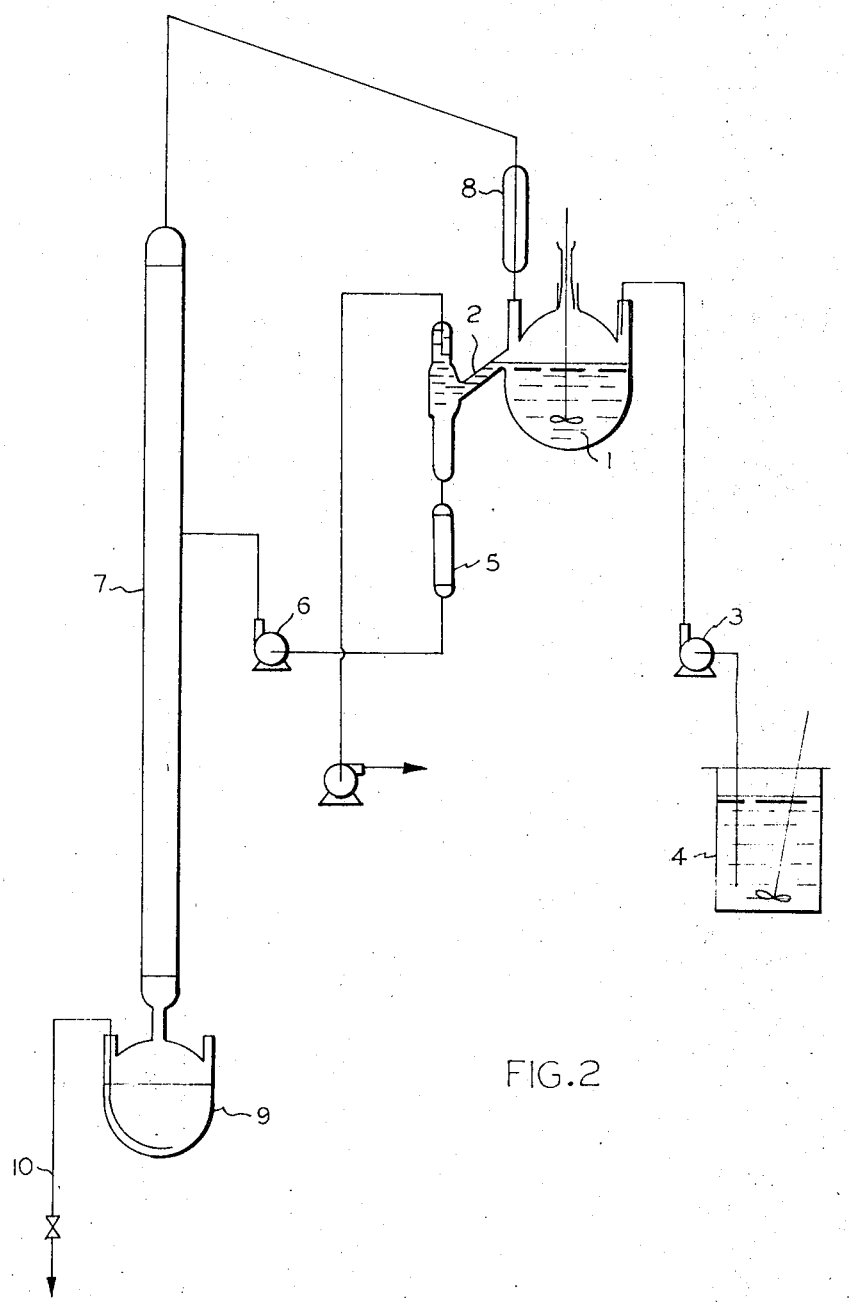

(A) 600 cc. of an aqueous solution of 70% formaldehyde were put together with 800 cc. of 1,1,2,2-tetrachlorethane as an extracting agent into a reactor 1 of a capacity of 2 liters having a two-layer separating side tube 2 as shown in FIG. 2 and the contents were kept at 96° C. by being heated while being stirred. 120 g. of potassium bisulfate as a catalyst were added thereto and, at the same time, an extracting agent was injected at a rate of 4 liters/hour into the reactor through a pump 3 from a tank 4. With the increase of the amount of the liquid in the reactor, the mixed liquid of the raw material phase and the extracting agent entered the two-layer separating tube kept at 90° C. The liquid was left standing there without the influence of stirring and the raw material phase and the extracting agent separated into two layers. The extracting agent separated into two layers. The extracting agent higher in the specific gravity and present in the lower part came out of the bottom part of the two-layer separating tube, passed through a small tube 5 filled with a weak anion exchange resin and was then fed at a rate of 4.2 liters/hour through a pump 6 into a glass ring reaction was carried out for 6 hours to obtain 24 liters of the extracting agent containing 0.7% by weight tetraoxane. When it was concentrated under a reduced pressure and to deposit crystals of tetraoxane, 244 g. of refined tetraoxane were obtained.

What is claimed is:

1. A process for producing tetraoxane comprising adding to at least one formaledheyde source selected from the group consisting of an aqueous solution of formaldehyde and an alcohol solution of formaldehyde, paraformaldehyde, alpha-polyoxymethylene, beta-polyoxymethylene and gamma-polyoxymethylene, an acid catalyst and an inert organic extracting agent capable of dissolving tetraoxane and of forming a phase separate from said formaldehyde source when mixed therewith, said inert organic extracing agent being at least one agent selected from the group consisting of straight chain and cyclic aliphatic hydrocarbons containing 5 to 10 carbon atoms, chlorinated and fluorinate aliphatic hydrocarbons having 1 to 10 carbon atoms, aromatic hydrocarbons containing 6 to 10 carbon atoms, chlorinated, fluorinated and nitrated aromatic hydrocarbons containing 6 to 12 carbon atoms and alkyl ethers containing 4 to 12 carbon atoms, maintaining the resulting mixture at a temperature in the range of 40 to 200° C. and separating tetraoxane from said organic extracting agent.

2. A process as claimed in claim 1 wherein the produced tetraoxane is extracted with said inert organic extracting agent so that the tetraoxane concentration in said reaction system may remain below its equilibrium concentration.

3. A process as claimed in claim 1 wherein said inert organic extracting agent is used in a volume 0.1 to 100 times as large as that of said formaldehyde source.

4. A process as claimed in claim 1 wherein said inert organic extracting agent is used in a volunme 4 to 100 times as large at that of said formaldehyde source and said formaldehyde source is selected from the group consisting of paraformaldehyde, alpha - polyoxymethylene, beta-polyoxymethylene and gamma-polyoxymethylene.

5. A process as claimed in claim 1 wherein said inert organic extracting agent is used in a volume 0.1 to 5 times as large as that of said formaldehyde source and said formaldehyde source is selected from the group consisting of an aqueous solution of formaldehyde and alcohol solution of formaldehyde.

6. A process as claimed in claim 1 wherein said acid catalyst is at least one substance selected from the group consisting of inorganic acids and their acid salts, inorganic salts producing acids by reaction with water, organic carboxylic acids, organic sulfonic acids, sulfonic acid type cation exchange resins and picric acid.

7. A proces as claimed in claim 1 wherein said acid catalyst is used in an amount of 0.001 to 50% based on the weight of said formaldehyde source.

8. A process as claimed in claim 1 wherein at least one substance selected from the group consisting of chlorides of alkali metals and alkaline earth metals and sulfates of alkali metals is added into the said reaction system.

9. A process as claimed in claim 1 wherein the by-produced trioxane and unreacted formaldehyde are separated from the tetraoxane and is recirculated to the reaction system.

10. A process as claimed in claim 1 wherein the reaction temperature is kept in a range of 60 to 150° C.

11. A process as claimed in claim 1 wherein said formaldehyde source, catalyst an extracting agent are continuously added to a reaction zone and extracting agent containing produced tetraoxane are continuously removed from said reaction zone.

References Cited

UNITED STATES PATENTS 3,426,041   2/1969   Miyake et al. _____ 260—340

NORMA S. MILESTONE, Primary Examiner